United States Patent
Parks

(10) Patent No.: US 8,560,810 B2
(45) Date of Patent: Oct. 15, 2013

(54) MICROPROCESSOR WITH MICROTRANSLATOR AND TAIL MICROCODE INSTRUCTION FOR FAST EXECUTION OF COMPLEX MACROINSTRUCTIONS HAVING BOTH MEMORY AND REGISTER FORMS

(75) Inventor: Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 750 days.

(21) Appl. No.: 12/766,244

(22) Filed: Apr. 23, 2010

(65) Prior Publication Data

US 2011/0040953 A1 Feb. 17, 2011

Related U.S. Application Data

(60) Provisional application No. 61/234,008, filed on Aug. 14, 2009.

(51) Int. Cl.
G06F 9/30 (2006.01)
(52) U.S. Cl.
USPC .......................................... 712/208; 712/209
(58) Field of Classification Search
None
See application file for complete search history.

(56) References Cited

U.S. PATENT DOCUMENTS

| 5,247,624 A | * | 9/1993 | Koumoto et al. | 712/211 |
| 5,394,558 A | * | 2/1995 | Arakawa et al. | 712/211 |
| 5,465,224 A | * | 11/1995 | Guttag et al. | 708/236 |
| 5,864,690 A | * | 1/1999 | Henry et al. | 712/208 |
| 6,041,403 A | * | 3/2000 | Parker et al. | 712/210 |

* cited by examiner

Primary Examiner — Andrew Caldwell
Assistant Examiner — Keith Nielsen
(74) Attorney, Agent, or Firm — E. Alan Davis; Gary Stanford

(57) ABSTRACT

A microprocessor includes a first instruction translator that translates an instruction of an instruction set architecture of a microprocessor. The instruction may specify a first form that writes its result to a destination register or a second form that writes its result to memory. The first instruction translator generates, in response to encountering an instance of the instruction, an indication of whether the instance is of the first form or the second form. A microcode memory stores a tail instruction as part of a microcode routine invoked in response to encountering the instance of the instruction. A second instruction translator receives the tail instruction from the microcode memory and the indication and responsively generates a first micro-operation that writes the result to the destination register if the indication specifies the first form or a second micro-operation that completes a write of the result to memory if the indication specifies the second form.

23 Claims, 2 Drawing Sheets

MICROPROCESSOR WITH MICROTRANSLATOR AND TAIL MICROCODE INSTRUCTION FOR FAST EXECUTION OF COMPLEX MACROINSTRUCTIONS HAVING BOTH MEMORY AND REGISTER FORMS

CROSS REFERENCE TO RELATED APPLICATION(S)

This application claims priority based on U.S. Provisional Application Ser. No. 61/234,008, filed Aug. 14, 2009, entitled MICROPROCESSOR WITH MICROTRANSLATOR AND TAIL MICROCODE INSTRUCTION FOR FAST EXECUTION OF COMPLEX MACROINSTRUCTIONS HAVING BOTH MEMORY AND REGISTER FORMS, which is hereby incorporated by reference in its entirety.

FIELD OF THE INVENTION

The present invention relates in general to the field of microprocessors, and particularly to microprocessors that include microcode.

BACKGROUND OF THE INVENTION

Many contemporary microprocessors include a micro-architecture that is distinct from their architecture, or macroarchitecture. One characteristic of such a microprocessor is that it includes an instruction translator that translates macroinstructions (e.g., x86 instructions) of the microprocessor's instruction set architecture into one or more microinstructions, or micro-operations, of the micro-architecture instruction set. When the instruction translator encounters a macroinstruction that must be translated into more micro-operations than the instruction translator can generate per clock cycle, the instruction translator generates a prolog of micro-operations. The remainder of the instructions to implement the macroinstruction is fetched from a microcode Read-Only-Memory (ROM). The sequence of instructions fetched from the microcode ROM is referred to herein as the "microcode tail." The micro-operations of the prolog generated by the translator can be customized for the form of the instruction. The most common customization is to generate a different prolog for a memory form of a macroinstruction versus a register form of the macroinstruction. For a memory-based form, the translator generates a load instruction to load the source operand into a temporary register of the microprocessor; whereas, for a register-based form, the translator generates a move instruction to move of the source register to the temporary register. The problem is in the microcode tail. For the memory form, a store micro-operation is needed to store the result to memory; whereas, for the register form, the result needs to be moved to the destination register.

Normally, the microcode tail would include a conditional branch to go to either a tail for the register-based form or a tail for the memory-based form. However, conditional branch instructions can be costly to performance.

BRIEF SUMMARY OF INVENTION

In one aspect the present invention provides a microprocessor. The microprocessor includes a first instruction translator configured to translate an instruction of an instruction set architecture of a microprocessor. The instruction may specify a first form that instructs the microprocessor to write its result to a destination register or a second form that instructs the microprocessor to write its result to memory. The first instruction translator is further configured to generate, in response to encountering an instance of the instruction, an indication of whether the instance is of the first form or the second form. The microprocessor also includes a microcode memory configured to store a tail instruction as part of a microcode routine invoked by the first instruction translator in response to encountering the instance of the instruction. The microprocessor also includes a second instruction translator configured to receive the tail instruction from the microcode memory and the indication. If the indication specifies the first form, the second instruction translator responsively generates a first micro-operation that writes the result to the destination register. If the indication specifies the second form, the second instruction translator responsively generates a second micro-operation that completes a write of the result to memory.

In another aspect, the present invention provides a method. The method includes storing in a microcode memory of a microprocessor a tail instruction that is part of a microcode routine. The method also includes encountering an instruction of an instruction set architecture of the microprocessor. The instruction may specify a first form that instructs the microprocessor to write its result to a destination register or a second form that instructs the microprocessor to write its result to memory. The method also includes generating an indication of whether the instance of the instruction is of the first form or the second form and invoking the microcode routine, in response to said encountering the instance of the instruction. The method also includes, in response to receiving the tail instruction and the indication, generating a first micro-operation that writes the result to the destination register if the indication specifies the first form and generating a second micro-operation that completes a write of the result to memory if the indication specifies the second form.

In yet another aspect, the present invention provides a computer program product for use with a computing device, the computer program product comprising a computer usable storage medium having computer readable program code embodied in said medium for specifying a microprocessor. The computer readable program code includes first program code for specifying a first instruction translator configured to translate an instruction of an instruction set architecture of a microprocessor. The instruction may specify a first form that instructs the microprocessor to write its result to a destination register or a second form that instructs the microprocessor to write its result to memory. The first instruction translator is further configured to generate, in response to encountering an instance of the instruction, an indication of whether the instance is of the first form or the second form. The computer readable program code also includes second program code for specifying a microcode memory configured to store a tail instruction as part of a microcode routine invoked by the first instruction translator in response to encountering the instance of the instruction. The computer readable program code also includes third program code for specifying a second instruction translator configured to receive the tail instruction from the microcode memory and the indication. If the indication specifies the first form, the second instruction translator responsively generates a first micro-operation that writes the result to the destination register. If the indication specifies the second form, the second instruction translator responsively generates a second micro-operation that completes a write of the result to memory.

DETAILED DESCRIPTION OF THE INVENTION

To solve the problem, we provide a new microcode instruction, referred to as the TAIL instruction. A microtranslator translates the TAIL instruction into the appropriate store or move depending on whether the macroinstruction was a register or memory form, which is indicated in a register populated by the instruction translator with the necessary information when it translates the macroinstruction. This avoids the need for the conditional branch instruction in the microcode tail.

Figure 1:
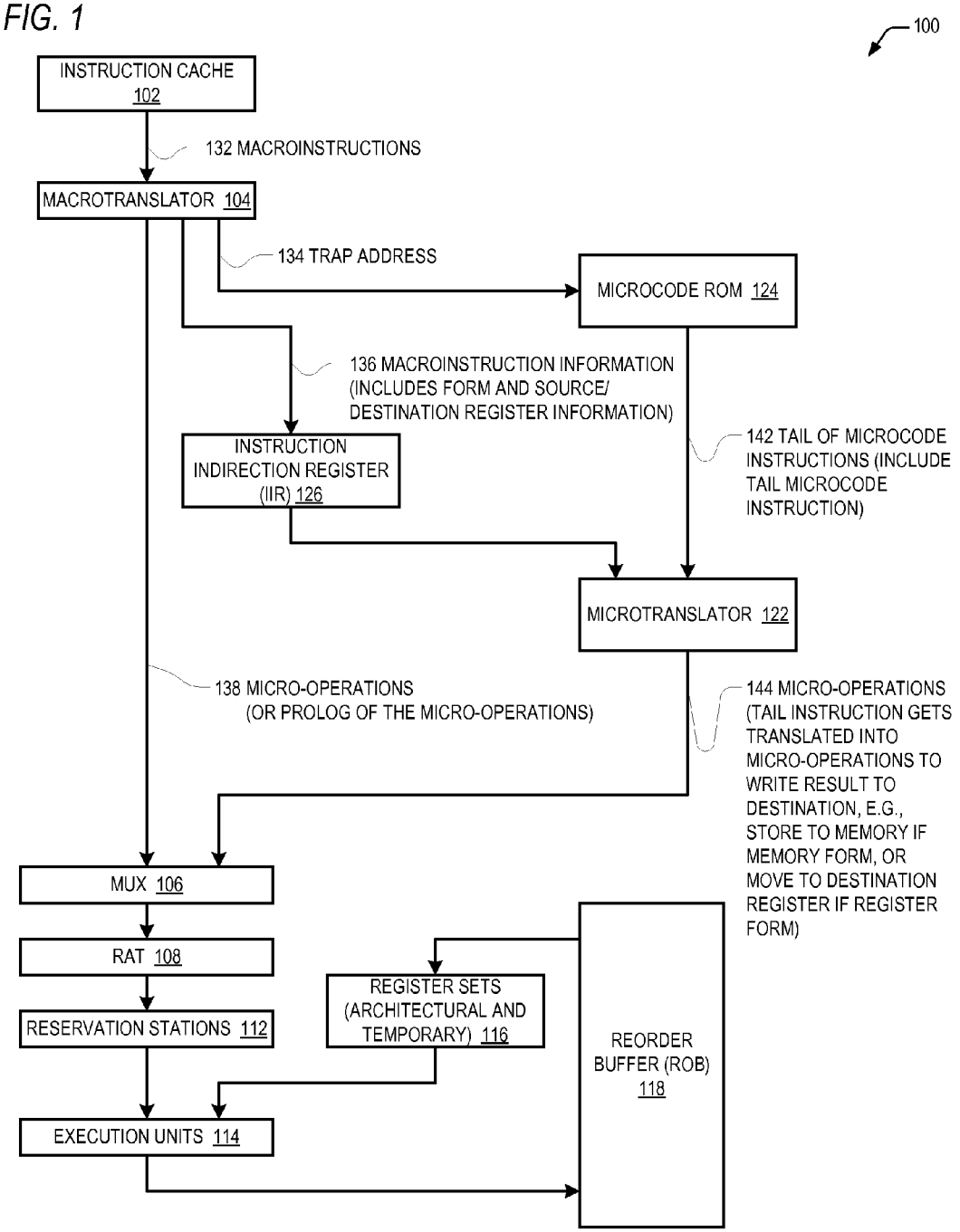
FIG. 1 is a block diagram illustrating a microprocessor according to the present invention.

Referring now to FIG. 1, a block diagram illustrating a microprocessor 100 is shown. The microprocessor 100 includes an instruction cache 102 that caches instructions of the instruction set architecture of the microprocessor 100, referred to herein as macroinstructions 132. For example, in one embodiment the instruction set architecture substantially conforms to the x86 instruction set architecture.

A macrotranslator 104 receives the macroinstructions 132 from the instruction cache 102 and translates them into micro-operations 138. The macrotranslator 104 is capable of translating a macroinstruction 132 into at most N micro-operations 138. In one embodiment, N is three. Therefore, if the macroinstruction 132 is sufficiently complex such that it requires more than N micro-operations 138 to implement it, the macrotranslator 104 generates the micro-operations 138 as a prolog of the micro-operations 138 and also generates a trap address 134 to a microcode ROM 124.

The macrotranslator 104 also generates macroinstruction information 136 that is written to an instruction indirection register (IIR) 126. The macroinstruction information 136 stored in the IIR 126 includes, for example, information identifying the source and destination registers specified by the macroinstruction 132 and the form of the macroinstruction 132, such as whether the macroinstruction 132 operates on an operand in memory or in an architectural register 116 of the microprocessor 100. This enables the microcode routines to be generic, i.e., without having to have a different microcode routine for each different source and/or destination architectural register 116.

The microcode ROM 124 stores and outputs microcode instructions 142 of microcode routines. The microcode ROM 124 is part of a larger microcode unit (not shown) that includes a microsequencer (not shown) that provides a fetch address (not shown) to the microcode ROM 124 to specify the address of the next microcode instruction 142 to output. The initial fetch address is the trap address 134 provided by the macrotranslator 104. The microcode instructions 142 may be viewed as a tail of microcode instructions 142 relative to the prolog of the micro-operations 138, which together implement the macroinstruction 132. In particular, the microcode instructions 142 may include a new instruction referred to as the TAIL instruction, which is discussed in more detail below. In one embodiment, each microcode instruction 142 is 38 bits wide.

A microtranslator 122 receives the microcode instructions 142 from the microcode ROM 124 and translates them into micro-operations 144. Additionally, the microtranslator 122 receives the contents of the IIR 126. In particular, as described in more detail below, the microtranslator 122 translates the TAIL microcode instruction into different sequences of micro-operations 144 depending upon the information received from the IIR 126, more specifically depending upon the form of the macroinstruction 132. In one embodiment, each micro-operation 144 is approximately 200 bits wide. In one embodiment, the microtranslator 122 is capable of generating up to three micro-operations from a microcode instruction 142.

A multiplexer (mux) 106 receives the prolog of the micro-operations 138 from the macrotranslator 104 and the tail micro-operations 144 from the microtranslator 122 and provides the appropriate micro-operations to a register alias table (RAT) 108 of the microprocessor 100. The RAT 108 generates dependencies for the micro-operations. The RAT 108 provides the micro-operations and dependency information to reservation stations 112 that hold the micro-operations until they are ready to be issued to one of the execution units 114. The execution units 114 receive operands from the register sets 116 of the microprocessor 100, which include the architectural register set and a temporary register set used by the micro-architectural instruction set. A reorder buffer (ROB) 118 receives the micro-operation results from the execution units 114 and retires the results to the architectural state of the microprocessor 100 in program order.

Figure 2:
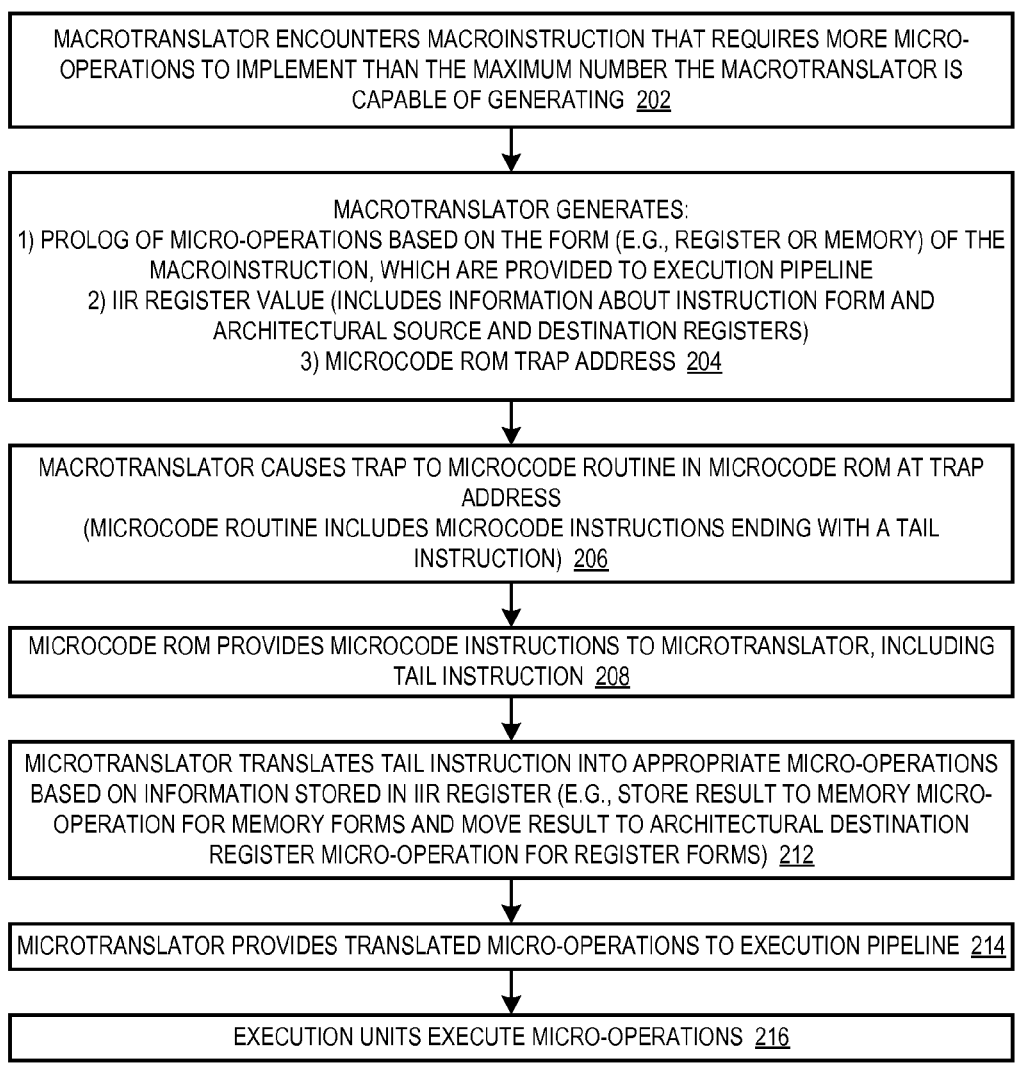
FIG. 2 is a flowchart illustrating operation of the microprocessor of FIG. 1.

Referring now to FIG. 2, a flowchart illustrating operation of the microprocessor 100 of FIG. 1 is shown. Flow begins at block 202.

At block 202, the macrotranslator 104 encounters a macroinstruction 132 that requires more micro-operations to implement than the maximum number the macrotranslator 104 is capable of generating. Flow proceeds to block 204.

At block 204, the macrotranslator 104 generates a prolog of the micro-operations 138 in response to the macroinstruction 132 based on the form of the macroinstruction 132. Specifically, the prolog of the micro-operations 138 includes micro-operations to load the source operand from memory into a temporary register 116 if the macroinstruction 132 is a memory form, and the prolog of the micro-operations 138 includes micro-operations to move the source operand from the source register specified by the macroinstruction 132 to the temporary register 116 if the macroinstruction 132 is a register form. Additionally, the macrotranslator 104 writes the macroinstruction information 136 to the IIR 126. Finally, the macrotranslator 104 generates the trap address 134 to specify the microcode routine in the microcode ROM 124 that includes the microcode tail for the macroinstruction 132. Flow proceeds to block 206.

At block 206, the macrotranslator 104 causes a trap to the microcode routine in the microcode ROM 124 at the trap address 134. The microcode routine includes a TAIL microcode instruction. Flow proceeds to block 208.

At block 208, the microcode ROM 124 provides the microcode instructions 142 to the microtranslator 122, including the TAIL instruction. Flow proceeds to block 212.

At block 212, the microtranslator 122 translates the TAIL instruction into the appropriate micro-operations 144 based on the information stored in the IIR 126. Specifically, if the IIR 126 indicates the macroinstruction 132 is a memory form, the microtranslator 122 generates a micro-operation to store the result from the temporary register to memory; whereas, if the IIR 126 indicates the macroinstruction 132 is a register form, the microtranslator 122 generates a micro-operation to move the result from the temporary register to the architectural destination register 116 specified by the IIR 126. Flow proceeds to block 214.

At block 214, the microtranslator 122 provides the translated micro-operations 144 to the mux 106. Flow proceeds to block 216.

At block 216, the execution units 114 execute the micro-operations 144. Advantageously, the execution units 114 do not have to execute a conditional branch instruction that was required before the advent of the TAIL instruction. Flow ends at block 216.

An example of a macroinstruction 132 that requires more than three micro-operations according to one embodiment of the microprocessor 100 is the x86 RCR (rotate through carry right) instruction. The RCR instruction can specify its source operand to be in memory or to be in a general purpose register 116. According to one embodiment, when the macrotranslator 104 encounters a RCR instruction at block 202, it generates the following prolog of the micro-operations 138 for the register form:

```
mov temp1, Src;    // moves the source register (Src) into temp1 register
and temp2, 0x1F;   // mask off all but lowest 5 bits of the count
```

The macrotranslator 104 generates the following prolog of the micro-operations 138 for the memory form:

```
ldsta temp1, srcBase, srcIndex, srcSeg; // load memory operand into temp1
                                         // and generate store address using same address
                                         // operands used to generate load address;
                                         // this is a merged load/store address instruction
                                         // described in U.S. Application 12/100,616
                                         // filed 04/10/2008, issued as U.S. Pat. No. 8,069,340
                                         //on 11/29/2011, which is hereby
                                         // incorporated by reference.
and temp2, 0x1F; // mask off all but lowest 5 bits of the count
```

The microcode routine in the microcode ROM 124 includes:

```
rcr_trap_addr:
loop:
    RCR      temp1, temp1, 1;   // rotate right temp1 through carry one bit
    LOOPE    temp2, 1, exit;    // decrement count and goto exit if equals 1
    JMP      loop;              // jump back to top of loop
exit:
    TAIL     temp1;             // write the result in temp1 to destination
                                // destination depends on IIR register information
```

The microtranslator 122 translates the TAIL instruction into the following micro-operation sequence for the register form:

```
mov Dest, temp1;   // move the result in temp1 to the architectural
                   // destination register specified in IIR
```

The microtranslator 122 translates the TAIL instruction into the following micro-operation sequence for the memory form:

```
std temp1; // store the result in temp1 to memory
```

It should be noted that the code above is pseudo-code simplified for clarity of communication rather than implemented code.

An advantage of the microprocessor described above is that it eliminates one or more conditional branch instructions that would otherwise need to be included in the microcode in order to accommodate the various forms of the macroinstructions. This is particularly advantageous because conditional branch instructions can be very costly to performance, particularly those generated by the microcode unit. This is at least in part due to the fact that in one embodiment the microcode unit does not include a branch predictor. The performance penalty increases as the length of the execution pipeline grows.

Another advantage is that the size of the microcode ROM may be reduced since it may include fewer conditional branch instructions.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A microprocessor, comprising:
    a first instruction translator, configured to translate an instruction of an instruction set architecture of the microprocessor, wherein the instruction may specify a first form that instructs the microprocessor to write a result of the instruction to a destination register or a second form that instructs the microprocessor to write the result to memory, wherein the first instruction translator is further configured to generate, in response to encountering an instance of the instruction, an indication of whether the instance is of the first form or the second form;

a microcode memory, configured to store a tail instruction as part of a microcode routine invoked by the first instruction translator in response to encountering the instance of the instruction; and a second instruction translator, configured to receive the tail instruction from the microcode memory and the indication, wherein if the indication specifies the first form the second instruction translator responsively translates the tail instruction into a first micro-operation that when executed by the microprocessor, causes the microprocessor to write the result to the destination register, wherein if the indication specifies the second form the second instruction translator responsively translates the tail instruction into a second micro-operation that when executed by the microprocessor, causes the microprocessor to complete a write of the result to memory.

2. The microprocessor of claim 1, wherein the presence of the tail instruction within the microcode routine enables the absence in the microcode routine of a conditional branch instruction that would have directed instruction flow to either the first or the second micro-operation based on whether the indication specified the first form or the second form.

3. The microprocessor of claim 1, further comprising:
a register, configured to receive the indication from the first instruction translator and to provide the indication to the second instruction translator.

4. The microprocessor of claim 1, wherein the first instruction translator is further configured to generate a prolog of micro-operations, in response to encountering the instance of the instruction, wherein the prolog and the microcode routine implement the instruction.

5. The microprocessor of claim 4, further comprising:
one or more execution units, configured to receive and execute the micro-operations of the prolog generated by the first instruction translator in response to encountering the instance of the instruction and to receive and execute the first or second micro-operation generated by the second instruction translator in response to the tail instruction.

6. The microprocessor of claim 4, wherein the prolog generated by the first instruction translator includes a micro-operation that reads a source operand from a source register if the instance of the instruction specifies the first form, wherein the prolog generated by the first instruction translator includes a micro-operation that reads a source operand from memory if the instance of the instruction specifies the second form.

7. The microprocessor of claim 4, wherein the prolog generated by the first instruction translator includes a micro-operation that initiates the write of the result to memory if the instance of the instruction specifies the second form.

8. The microprocessor of claim 1, wherein the instruction requires more micro-operations to implement than a maximum number of micro-operations the first instruction translator is capable of generating in a clock cycle of the microprocessor.

9. The microprocessor of claim 1, wherein the first instruction translator is further configured to generate an address of the microcode routine to the microcode memory, in response to encountering the instance of the instruction.

10. The microprocessor of claim 1, wherein the instruction comprises a rotate instruction.

11. The microprocessor of claim 10, wherein the rotate instruction comprises an x86 architecture Rotate through Carry Right (RCR) instruction.

12. A method, comprising:
storing in a microcode memory of a microprocessor a tail instruction as part of a microcode routine;
encountering an instance of an instruction of an instruction set architecture of the microprocessor, wherein the instruction may specify a first form that instructs the microprocessor to write a result of the instruction to a destination register or a second form that instructs the microprocessor to write the result to memory;
in response to said encountering the instance of the instruction:
generating an indication of whether the instance of the instruction is of the first form or the second form; and
invoking the microcode routine; and
in response to receiving the tail instruction and the indication:
translating the tail instruction into a first micro-operation that when executed by the microprocessor, causes the microprocessor to write the result to the destination register, if the indication specifies the first form; and
translating the tail instruction into a second micro-operation that when executed by the microprocessor, causes the microprocessor to complete a write of the result to memory, if the indication specifies the second form.

13. The method of claim 12, wherein the presence of the tail instruction within the microcode routine enables the absence in the microcode routine of a conditional branch instruction that would have directed instruction flow to either the first or the second micro-operation based on whether the indication specified the first form or the second form.

14. The method of claim 12, wherein said encountering the instance of the instruction, said generating the indication, and said invoking the microcode routine are performed by a first instruction translator of the microprocessor, wherein said translating the tail instruction into the first or second micro-operation is performed by a second instruction translator of the microprocessor.

15. The method of claim 14, wherein the instruction requires more micro-operations to implement than a maximum number of micro-operations the first instruction translator is capable of generating in a clock cycle of the microprocessor.

16. The method of claim 12, further comprising:
generating a prolog of micro-operations, in response to said encountering the instance of the instruction, wherein the prolog and the microcode routine implement the instruction.

17. The method of claim 16, further comprising:
executing the micro-operations of the prolog and the first or second micro-operation, wherein said executing is performed by one or more execution units of the microprocessor.

18. The method of claim 16, wherein the prolog includes a micro-operation that reads a source operand from a source register if the instance of the instruction specifies the first form, wherein the prolog includes a micro-operation that reads a source operand from memory if the instance of the instruction specifies the second form.

19. The method of claim 16, wherein the prolog includes a micro-operation that initiates the write of the result to memory if the instance of the instruction specifies the second form.

20. The method of claim 12, wherein said invoking the microcode routine comprises generating an address of the microcode routine to the microcode memory, in response to said encountering the instance of the instruction.

21. The method of claim 12, wherein the instruction comprises a rotate instruction.

22. The method of claim 21, wherein the rotate instruction comprises an x86 architecture Rotate through Carry Right (RCR) instruction.

23. A computer program product for use with a computing device, the computer program product comprising:

a non-transitory computer usable storage medium, having computer readable program code embodied in said medium, for specifying a microprocessor, the computer readable program code comprising:

first program code for specifying a first instruction translator, configured to translate an instruction of an instruction set architecture of the microprocessor, wherein the instruction may specify a first form that instructs the microprocessor to write a result of the instruction to a destination register or a second form that instructs the microprocessor to write the result to memory, wherein the first instruction translator is further configured to generate, in response to encountering an instance of the instruction, an indication of whether the instance is of the first form or the second form;

second program code for specifying a microcode memory, configured to store a tail instruction as part of a microcode routine invoked by the first instruction translator in response to encountering the instance of the instruction; and third program code for specifying a second instruction translator, configured to receive the tail instruction from the microcode memory and the indication, wherein if the indication specifies the first form the second instruction translator responsively translates the tail instruction into a first micro-operation that when executed by the microprocessor, causes the microprocessor to write the result to the destination register, wherein if the indication specifies the second form the second instruction translator responsively translates the tail instruction into a second micro-operation that when executed by the microprocessor, causes the microprocessor to complete a write of the result to memory.

\* \* \* \* \*